United States Patent [19]

Coleman

[11] Patent Number: 5,303,790
[45] Date of Patent: Apr. 19, 1994

[54] QUICK ATTACHING POWER TAKE OFF

[76] Inventor: Lyle W. Coleman, R.R. 1, Box 228, Springfield, S. Dak. 57062

[21] Appl. No.: 892,236

[22] Filed: Jun. 2, 1992

[51] Int. Cl.⁵ .................... B60K 25/00; A01B 59/043; F16D 11/10
[52] U.S. Cl. ..................... 180/53.3; 172/47; 172/272; 192/67 P; 192/67 R; 180/14.4; 464/162
[58] Field of Search .......... 180/53.3, 53.1, 14.4, 180/900; 172/35, 47, 75, 125, 272; 192/67 R, 67 P; 464/162

[56] References Cited

U.S. PATENT DOCUMENTS

| | | | |
|---|---|---|---|
| 4,069,885 | 1/1978 | Gego et al. | 180/14.4 |
| 4,090,725 | 5/1978 | Perin | 180/53.3 X |
| 4,433,767 | 2/1984 | Thor | 192/67 P |
| 4,492,292 | 1/1985 | Thor | 192/67 R |
| 4,792,006 | 12/1988 | Nienhaus et al. | 180/53.3 |
| 4,887,680 | 12/1989 | Nozaka et al. | 180/53.3 |
| 4,934,471 | 6/1990 | Tanaka et al. | 180/53.3 X |
| 4,944,354 | 7/1990 | Langen et al. | 172/47 |

FOREIGN PATENT DOCUMENTS

| | | | |
|---|---|---|---|
| 0068106 | 1/1983 | European Pat. Off. | 180/53.1 |
| 1088954 | 10/1967 | United Kingdom | 172/47 |

Primary Examiner—Margaret A. Focarino
Assistant Examiner—Peter E. English

[57] ABSTRACT

A mechanism for the convenient and quick engagement of a power take-off of a farm tractor with a driven implement without the need for the operator to leave the tractor. The device is usable with a three point hitch for an implement and includes a spring loaded engagement shaft so that the power take off engagement is delayed until the implement is securely hitched.

3 Claims, 3 Drawing Sheets

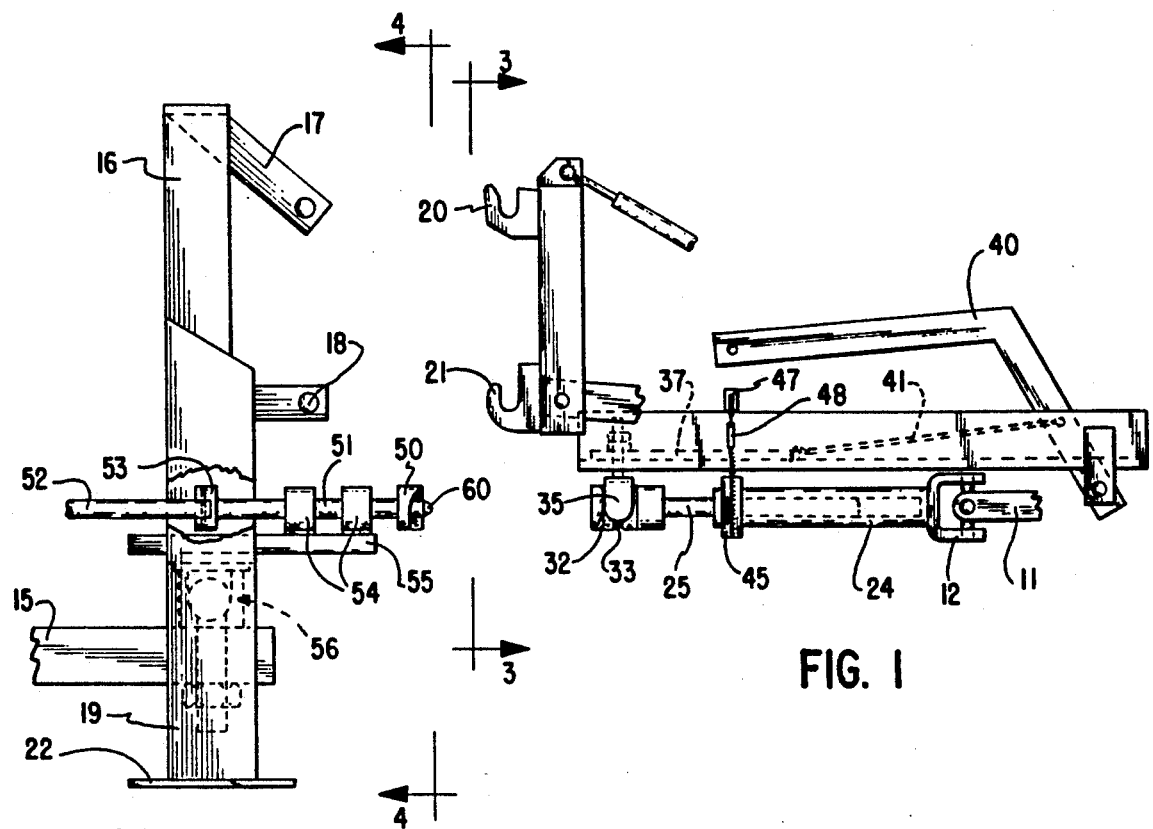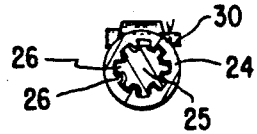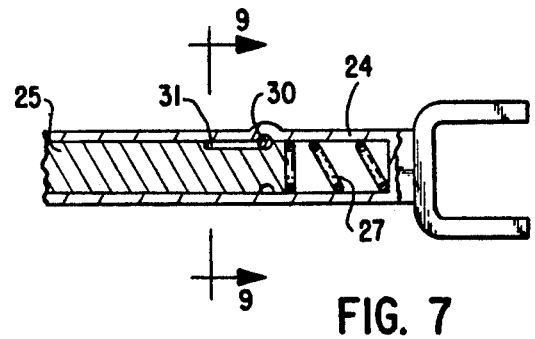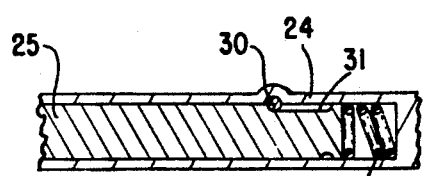

1

QUICK ATTACHING POWER TAKE OFF

BACKGROUND AND SUMMARY OF THE INVENTION

This pertains to farm implements, and more particularly to a mechanism e engagement of the power take off of a farm tractor to the shaft of a farm implement adapted to be driven by such power take off.

The advent of larger and heavier farm tractors and other machines has made manual hitching of implements to tractors less and less convenient. Therefore, the use of automatic or powered hitches has become common. A principal type of this sort of engagement is the three-point hitch by which the front of the implement is engaged and lifted.

Although automatically engageable hitches between the tractor and implement for pulling by the tractor are common, certain pulled implements may also be actively driven from the tractor through a power take off comprising a driving shaft extending from the rear of the tractor. Self-unloading wagons, manure spreaders and the like are examples of such implements. It will be obvious that some of the advantages of the automatic hitching of such devices is lost if it is necessary to dismount from the tractor to manually connect the power take off.

By the present invention, I provide a means to connect the power take off shaft of the tractor to the driven shaft of the implement at the same time as the pulling engagement of the tractor to the implement is achieved. A more complete understanding of the invention may be had from the following description of the figures.

BRIEF DESCRIPTION OF THE DRAWINGS

FIG. 1 is a side elevational view of the portion of the hitch attached to the tractor, FIG. 2 is a view similar to FIG. 1 of the matching parts of the hitch attached to the implement, FIG. 7 is a view partly in section of the driving shaft showing the means for disengagement of the shaft, FIG. 8 is a view similar to FIG. 7 showing the shaft in the retracted or disengaged position, and FIG. 9 is a sectional view from line 9—9 of FIG. 7.

DESCRIPTION

Figure 5:
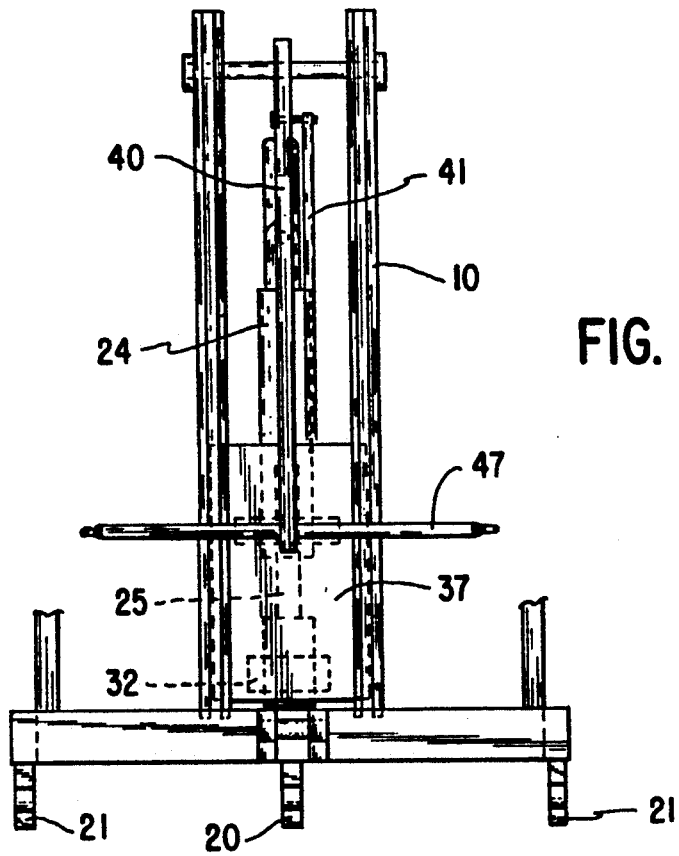
FIG. 5 is a top view of the portion of the hitch shown in FIGS. 1 and 3.

Briefly this invention comprises a device for the quick, easy and safe attachment of a farm implement to a tractor including the power driven mechanism on the implement. The attachment is sequential with the implement being attached first and the power drive second.

More specifically and referring to the drawings, the device is used with a tractor having a drawbar to which is attached an auxiliary frame 10 and a driven power take off shaft 11 including a universal joint 12. The frame 10 is mounted on the frame of the tractor above the drawbar and the power take off. The connected implement may include a tongue 15 to which is attached a hitch yoke 16. The hitch yoke is formed with an upper bracket 17 and a bar 18. Thus, the implement is readily engaged by the usual three-point hitch on the tractor. This hitch uses a single upper hook 20 and dual lower hooks 21 to engage the bracket 17 and bar 18 respectively, and is adapted to bracket the frame 10.

It should be noted that there are many types of attachment devices, especially those using the connection of a three point hitch and that the foregoing description of this particular form of quick attachment is not vital to the operation of the power drive attaching device.

The power take off shaft 11 in this invention drives a tubular socket member 24 through the universal joint 12. A drive shaft 25 is slidably telescoped into the socket member 24. The shaft 25 is driven by the socket 24 through mating splines 26 in the inner surface of the socket 24 and the outer surface of the shaft 25 (FIG. 9). Although the splined drive is preferred, it will be obvious that a key or keys engaged between the socket and shaft will accomplish the same result.

The shaft 25 is biassed toward a position outward of the socket 24 by a compression spring 27 within the socket 24. In order to prevent the shaft from becoming completely disengaged, it is necessary to provide some positive control of the movement of the shaft. The preferred device, as shown in FIGS. 7 and 8 as a pin 30 extending through the walls of the socket 24 and passing over a relieved area 31 on the splined surface of the shaft 25. Thus, the length of relief 31 determines the length of travel of the shaft 25 within the socket 24.

Power from the power take off shaft is transmitted through the splined shaft to a circumferentially grooved part 32 of a coupler. The coupler is composed of two mating parts, of which the grooved part 32 is one, and the mating part 50 is the other as will be later described. A circumferential groove 33 is formed in the part 32 for the purpose of controlling the longitudinal travel of the shaft 25 in the socket 24. A yoke 35 having pins 36 (FIG. 3) adapted to slide in the groove 33 is fixed to a sliding plate 37 by a bolt 38 or the like. This bolt should be threaded over a considerable length to allow vertical adjustment of the yoke 35 as needed. The plate 37 is slidable in grooves 39 provided near the outer end of the frame 10 so that the plate is slidable in a direction parallel to the axis of that frame.

The actual position of the plate 37 is determined by using a lever 40 pivotally connected to the drawbar and connected to the plate 37 through a link 41. Thus, the shaft 25 can be slidably moved within the socket 24 by moving the lever 40. This lever may be readily controlled from the seat of the tractor through rope, chain, or positive linkage as will be apparent to those skilled in the art.

Figure 3:
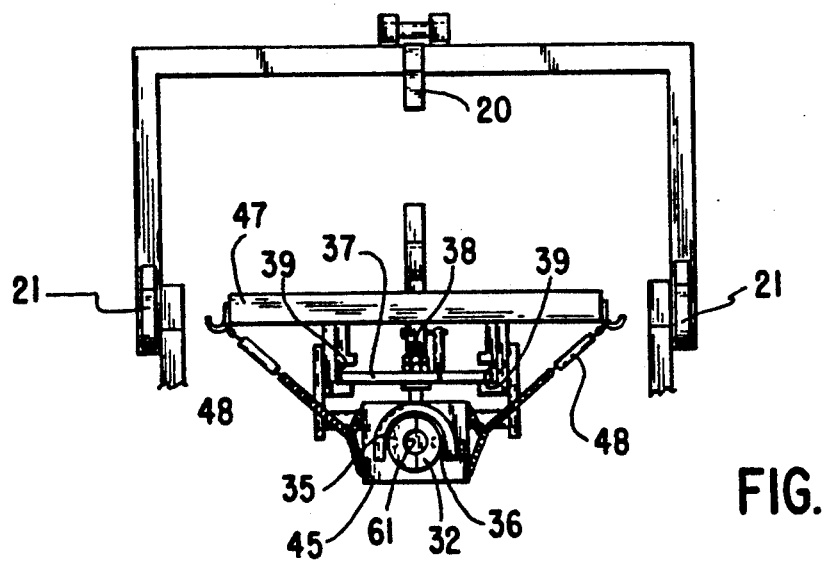
FIG. 3 is an elevational view from line 3—3 of FIG. 1.
Figure 6:
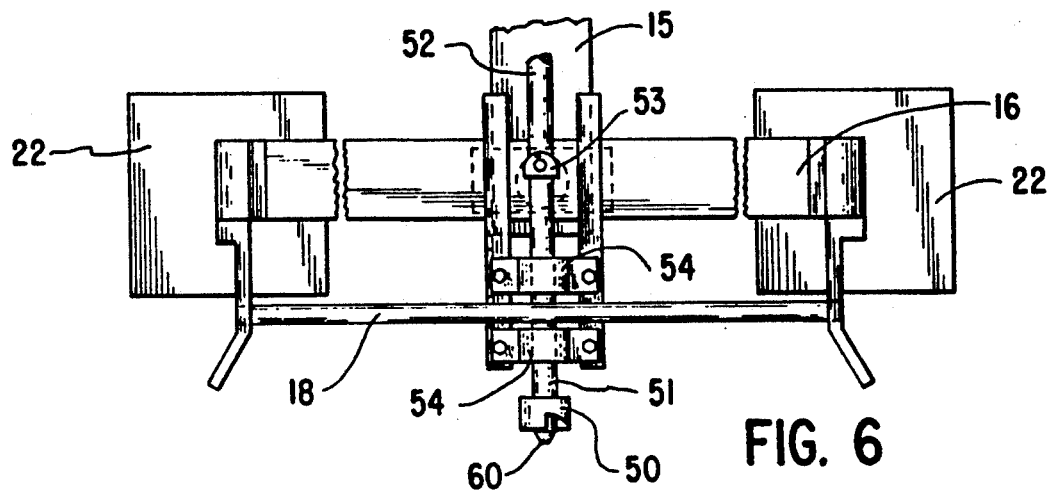
FIG. 6 is a view similar to FIG. 5 of the part of the hitch shown in FIGS. 2 and 4.
Figure 4:
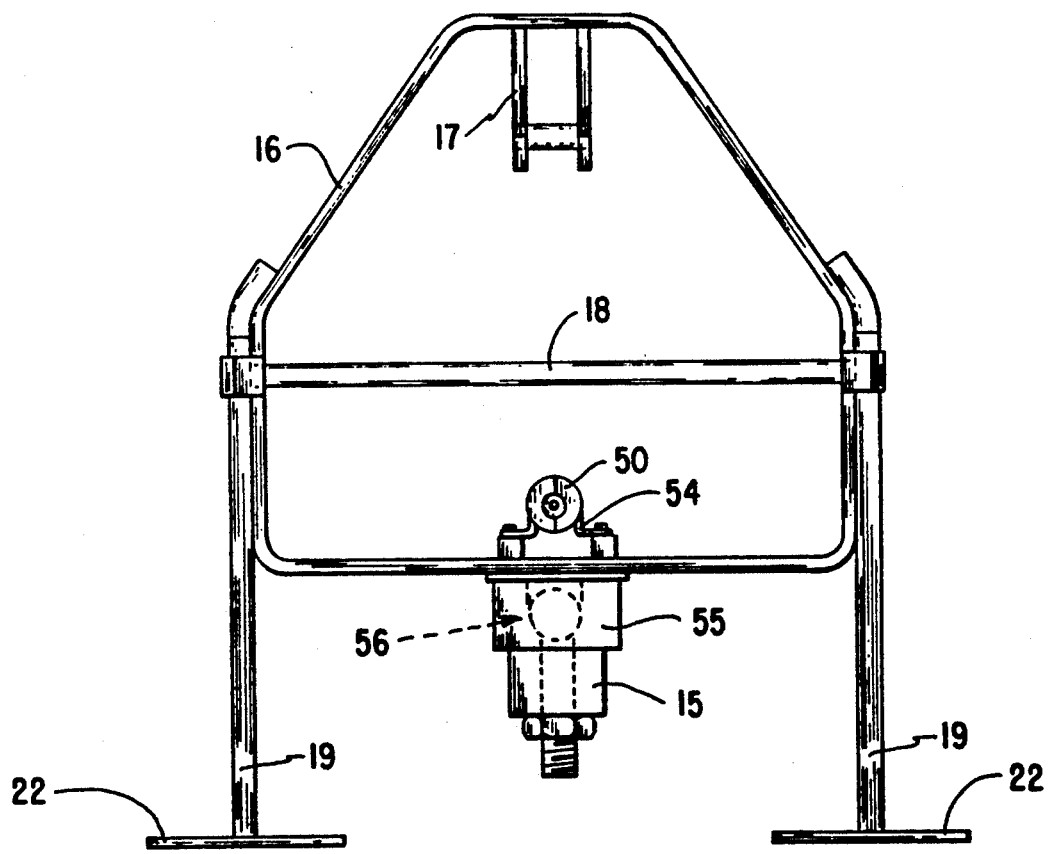
FIG. 4 is a view similar to FIG. 3 from line 4—4 of FIG. 2.

It is desirable to provide a movable bearing support for the shaft 25 and the socket 24 in order to make sure of proper alignment of the coupler parts as will later appear. A simple means for providing that support is illustrated in FIGS. 1 and 3. This means includes a bearing block 45 containing a bearing in which the socket 24 is journalled. This block 45 is supported from the frame 10 by means of springs 46 or the like connected between the block 45 and the ends of an outrigger bar 47 fixed transversely of the frame 10. Turnbuckles 48 may be used to adjust the position of the block 45 as necessary.

It will be apparent that the bearing block 45 could be held in permanent relationship to the frame 10. However, it is preferable to use the flexible mounting both to assure flexibility in the alignment of coupler parts 32 and 50 and so that no damage will be done to any part of the system in case of inadvertent contact with the ground. In such an event, the coupling 32 or other parts associated with it might well be damaged by being forced to the ground. By use of the flexible mounting, such damage is more easily avoided.

The coupling 32 is connectable with a mating coupling 50 on the drive shaft 51. This shaft 51 is connected to the regular implement shaft 52 by a universal joint 53. The shaft 51 is journalled in bearings enclosed in a pair of pillow blocks 54 mounted on a false tongue 55. Engagement between the implement tongue 15 and the false tongue 55 may be through an ordinary ball joint 56. Again it should be recognized that the particular type of hitch may well vary depending on the type of implement or the manufacturer. However, the flexibility built into the device allows considerable variation in types of hitches. In the particular type of hitch illustrated, it is desirable to keep the tongue off the ground. Therefore, supports 19 are provided on the hitch yoke 16. Feet 22 are also provided so that the supports 53 will not sink into soft dirt or mud when the implement is left.

In use, the implement is approached by a backing tractor. The coupling part 32 is in a withdrawn position, being controlled by the position of the lever 40 controlled from the seat or cab of the tractor. As the tractor backs up, it causes engagement of the three point hooks 20 and 21 with the bracket 17 and bar 18 or equivalent connection. At that point, the tongue of the implement may be raised to pulling position by operation of the three-point hitch of the tractor. In the raised position, the two coupling parts 32 and 50 are substantially aligned, and certain alignment can be obtained by using a pin 60 on one part of the coupling (illustrated as being on the coupling part 50). This pin is tapered at its end, and thus can slide into the mating hole 61 in the second part (shown as part 32) of the coupling.

When the lever 40 is released the spring 27 will press the two coupling parts 32 and 50 into engagement, and the power take-off is thus available to drive the implement shaft and therefore the implement. If the spring is not strong enough to move the shaft, or if it is desirable to do without a spring, it is evident that positive movement of the lever 40 acting through a stiff link 41, will also cause engagement between the parts of the coupling. Such positive movement may be achieved by powered means such as hydraulic controls or the like, or may very simply be a rigid link extending from the lever 40 to the cab or seat of the tractor. In any case, the desired result of establishing a driving connection from the power take off shaft of the tractor to the driven shaft of the implement has been achieved without dismounting from the tractor.

I claim as my invention:

1. A connecting mechanism for providing powdered engagement between a self-propelled mobile power source and an implement adapted to be driven and pulled by said power source, said power source including a pulling hitch having a connecting socket, and said implement including a pulling tongue having a ball matched to said connecting socket and normally connected to said socket; said connecting mechanism comprising power take off means on said power source, driven shaft means on said implement, a hitch yoke on said pulling tongue and having bearings mounted thereon, said driven shaft means including an implement shaft adapted to drive said implement and an auxiliary driven shaft journalled in said bearings on said hitch yoke, flexible connection means between said implement shaft and said auxiliary shaft in the vertical plane of said connecting ball, whereby misalignment of said shafts will be accommodated when said socket moves relative to said ball, driven coupling means releasably engaged between said power take off means and said driven shaft means, said coupling means comprising two separable matching parts, a first part driven by said power take off means and a second part normally in driven engagement with said first part, said second part being attached to said auxiliary driven shaft, said power take off means including drive means in the form of a socket, a sliding shaft drivingly engaged by said drive means and slidably received in said socket, said first part of the coupling being mounted on said sliding shaft whereby sliding of said shaft within said socket causes disengagement of said two separable matching parts.

2. The connecting mechanism of claim 1 in which said socket is journalled in a bearing, said bearing being held in a bearing block, said bearing block being flexibly mounted on said pulling hitch, said flexible mounting including flexible means engaged between said bearing block and said pulling hitch to suspend said bearing block below pulling hitch.

3. The connecting mechanism of claim 2 in which said flexible means includes adjustment means whereby the distance between said pulling hitch and said pocket can be adjusted.

* * * * *